No. 716,496. Patented Dec. 23, 1902.
C. TOLLES.
SPINDLE BEARING FOR AXLES.
(Application filed Sept. 20, 1901.)
(No Model.)
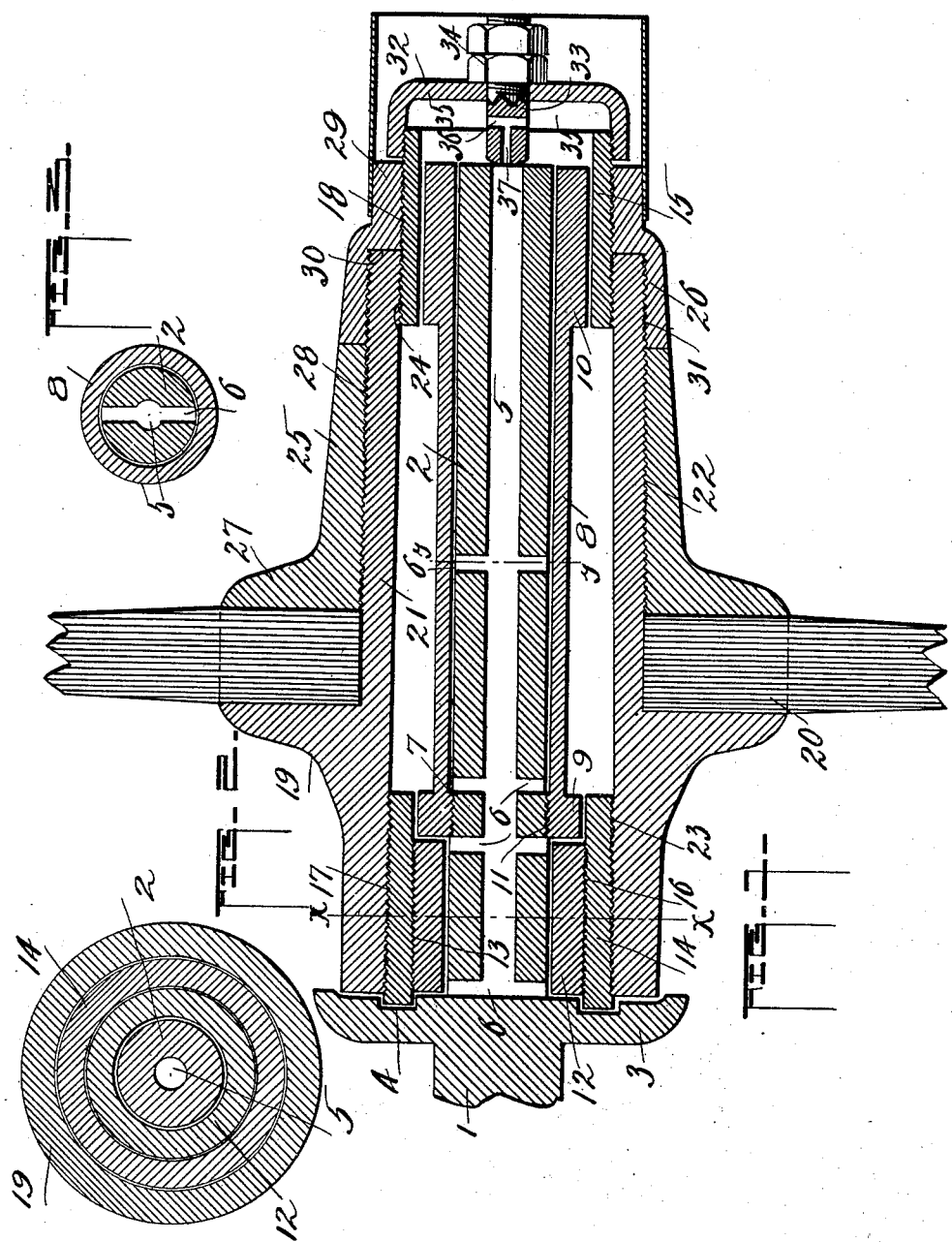

UNITED STATES PATENT OFFICE.

CORNELIUS TOLLES, OF PEORIA, ILLINOIS.

SPINDLE-BEARING FOR AXLES.

SPECIFICATION forming part of Letters Patent No. 716,496, dated December 23, 1902.

Application filed September 20, 1901. Serial No. 75,745. (No model.)

*To all whom it may concern:*

Be it known that I, CORNELIUS TOLLES, a citizen of the United States, residing at Peoria, in the county of Peoria and State of Illinois, have invented certain new and useful Improvements in Spindle-Bearings for Axles; and I do hereby declare that the following is a full, clear, and exact description of the invention, which will enable others skilled in the art to which it appertains to make and use the same.

This invention relates to a spindle-bearing for axles.

The object of the invention is to produce a spindle-bearing comprising a sleeve having a screw-threaded connection at its inner end with the spindle and arranged with annular flanges and collar on the spindle interposed between the inner end of the sleeve and sand-collar.

A further object is to provide bushings or boxings to which a hub of suitable construction has a screw-threaded relation, the inner bushing having screw connection with the collar and the outer having a bearing on the annular flange at the outer end of the sleeve.

With these and other objects in view the invention consists in certain novel features and details of construction.

Figure 1 is a vertical longitudinal sectional view of the spindle, sectional hub, and the bearing therefor. Fig. 2 is a transverse section as the same would appear if taken on the line *x x* of Fig. 1. Fig. 3 is a transverse section as the same would appear if taken on the line Y Y of Fig. 1.

In the drawings, 1 indicates the axle, having the spindle portion 2 and the sand-collar 3, the latter provided with the annular groove 4 in its outer face. The spindle 2 is provided with the centrally-disposed longitudinal duct 5, extending from the outer end thereof to the sand-collar, and 6 indicates transverse lubricating-ducts in the spindle arranged at proper points therein.

At 7 on the spindle I have provided the screw-threaded portion, as shown.

8 is a sleeve arranged with the annular flanges 9 and 10 at its inner and outer ends, respectively, and 11 is an interiorly-arranged screw-threaded portion at the inner end of the sleeve to enable the sleeve and spindle to have a screw connection at point 7 on the spindle.

12 is a collar arranged to be carried on the spindle and revoluble thereon, whereas the sleeve is non-revoluble, and the said collar is interposed between the inner end of the sleeves and the face of the sand-collar and has its exterior surface suitably screw-threaded, as shown at 13.

14 and 15 are bushings or boxings. The boxing 14 has the interior and exterior threads 16 and 17 and is adapted to have screw connection with the revoluble collar 12, with its inner end forming a collar revoluble in the groove 4 of the sand-boxing and its outer end extending over the annular flange 9 of the sleeve. The boxing 15 at the forward end of the spindle has a bearing on the flange 10 of the sleeve, and its exterior surface is threaded, as shown at 18.

For convenience I have illustrated and described a sectional hub attached to the devices above described, and while I describe the same they form no part of this invention.

19 denotes the main hub-section, provided with a circumferential series of sockets or mortises 20 for the reception of the inner end of the spokes, and 21 is a reduced annular extension of the said section and has its exterior surface screw-threaded at extension 22, and the said section is arranged with an interior screw (shown at 23) arranged for screw connection with the bushing or boxing 14, and for a short distance at its outer end is shown an interiorly-screw-threaded portion 24, having screw connection with a portion of the boxing 15. The hub comprises two other sections, which will be referred to as the "supplemental" section 25 and the "auxiliary" section 26. The section 25 in appearance is similar to the section 19, having an annular flange 27, bearing against the edge of partitions forming the sockets 20 and the side faces of the spokes, and the same has an interior thread arrangement 28 to enable the same to be screwed over the extension 21 for adjusting or locking the spokes in the aforesaid section, and the section 26 has the appearance of being part of the section 25 and is provided with the reduced annular portion 29, forming the offset 30, and the inner circumferential face of the said section is screw-threaded, as shown at 31. The same is adapted for screw connection with the extension 21 for retaining and locking the section 25 in position, and it further has screw connection with the bushing 15, the bushing extending beyond the edge of the extension 26 to permit the attaching of the cap 32, which has a screw connection with the bushing, as shown.

33 is a set-screw or spindle for taking up the end play of the bearing, having engagement with the cap 32 and centering on the end of the spindle and held in position by suitable lock-nuts 34. The arrangement of the cap 32 and the bushing 15 and component parts forms an oil-reservoir 35, from which the oil finds its way into the lubricating-ducts of the spindle for oiling parts adjacent thereto. The lubricant finds its way to the lubricating-ducts of the spindle through a transverse aperture 36 in the set-screw and a longitudinal duct 37, connecting therewith.

The steps of operation after the hub parts have been properly adjusted is to slide the collar 12 onto the spindle, screw on the bushing 14, and adjust the sleeve 8 on the spindle by the screw connection, as shown, slide the hub over the sleeve and secure it to the bushing 14, and connect the bushing 15 to the outer sections of the hub in the manner shown, which locks the parts firmly together, and screw on the cap 32.

I have disclosed in the specification a means for lubricating the parts of my device; but it is to be understood that no claim in this specification is made for such lubricating means.

I am aware that various other changes and modifications may be made, and I do not wish to be limited to the arrangement and details of construction as shown.

Having thus fully described my invention, what I claim, and desire to secure by Letters Patent of the United States, is—

1. A spindle-bearing for axles, comprising a spindle having a threaded portion, a non-revoluble sleeve provided with annular flanges and having a screw connection with said spindle, and a collar interposed on the spindle between the inner end of the sleeve and face of the sand-collar of the axle, substantially as described.

2. A spindle-bearing for axles, comprising a spindle having a threaded portion 7, a non-revoluble sleeve having screw connection with said spindle, duplicate bushings, revoluble around the inner and outer ends of said sleeve, a collar interposed on the spindle between the inner end of the sleeve and face of the sand-collar and arranged to have a revoluble connection with the inner bushing, substantially as described.

3. A spindle-bearing for axles, comprising a spindle having a threaded portion 7, a non-revoluble sleeve having screw connection with said spindle and provided at its inner and outer ends with annular flanges, a collar on said spindle, a bushing having a screw connection with said collar and a bushing having a bearing on the outer flange of the sleeve, said bushings arranged for connection with suitable hub, substantially as described.

In testimony whereof I affix my signature in presence of two witnesses.

CORNELIUS TOLLES.

Witnesses:
 ROBERT N. McCORMICK,
 CHAS. W. LA PORTE.